United States Patent [19]
Malden

[11] 3,941,794
[45] Mar. 2, 1976

[54] COATING OF PAPER WITH RESIN-TREATED SILICATES

[76] Inventor: Peter James Malden, Byways, Bodmin Hill, Lostwithiel, Cornwall, England

[22] Filed: Mar. 12, 1974

[21] Appl. No.: 450,386

Related U.S. Application Data

[63] Continuation of Ser. No. 183,664, Sept. 24, 1971, abandoned.

[30] Foreign Application Priority Data

Sept. 25, 1970 United Kingdom.............. 45911/70

[52] U.S. Cl..... 260/29.2 EP; 260/29.3; 260/29.4 R; 260/29.6 B; 260/29.7 R; 260/38; 260/395 B; 260/42.55; 427/387; 427/391; 428/452
[51] Int. Cl.$^2$............................................. C08K 3/34
[58] Field of Search......... 106/308 M; 117/62.2, 26, 117/27; 260/29.6 B, 29.4 R, 29.2 EP, 395 B, 38, 29.3, 29.7; 427/42.55, 387, 391; 428/452

[56] References Cited
UNITED STATES PATENTS

| | | | |
|---|---|---|---|
| 1,567,506 | 12/1925 | Hopkinson........................ | 260/34.2 |
| 2,674,587 | 4/1954 | Leek ........................... | 260/395 B X |
| 2,811,500 | 10/1957 | Cordier................................. | 260/39 |
| 3,057,811 | 10/1962 | Trachtenburg et al............. | 428/452 |
| 3,198,647 | 8/1965 | Kress ................................ | 260/38 X |
| 3,251,800 | 5/1966 | Cooley et al.................... | 260/395 B |
| 3,298,987 | 1/1967 | Colgan et al...................... | 117/28 X |
| 3,513,121 | 5/1970 | Heaton............................ | 260/29.7 R |
| 3,544,500 | 12/1970 | Osmond et al............... | 260/42.55 X |
| 3,563,932 | 2/1971 | Vainogy et al................ | 260/42.55 X |
| 3,671,472 | 6/1972 | McNamee et al. ................. | 428/452 |
| 3,674,726 | 7/1972 | Kirk................................ | 428/452 |
| 3,829,402 | 8/1974 | Zimmermann et al. ..... | 260/42.55 X |

FOREIGN PATENTS OR APPLICATIONS

1,156,761  11/1963  Germany........................ 106/308 M

*Primary Examiner*—Donald E. Czaja
*Assistant Examiner*—S. M. Person
*Attorney, Agent, or Firm*—Stevens, Davis, Miller & Mosher

[57] ABSTRACT

A method of preparing a mineral which is suitable for use in the coating of paper includes the steps of (i) forming a substantially uniform suspension of fine particles of the mineral in water; (ii) admixing the suspension thus obtained with a water-soluble or water-dispersible polymer which is such that, on dewatering and drying the suspension, the particles of the mineral adhere to the polymer and to one another and the polymer is rendered irreversibly insoluble and non-dispersible in water; and (iii) dewatering and drying the suspension to form the desired mineral.

9 Claims, No Drawings

COATING OF PAPER WITH RESIN-TREATED SILICATES

This is a continuation of application Ser. No. 183,664, filed Sept. 24, 1971, now abandoned.

BACKGROUND OF THE INVENTION

This invention relates to the treatment of minerals, and more particularly is concerned with the treatment of minerals which can be employed in the coating of paper.

Many varieties of coated paper are produced today. They are principally coated with a paper coating composition, sometimes known as the coating colour, which essentially comprises an adhesive, also known as a binder, and a pigment dispersed in a suitable liquid medium. The adhesive used can be, for example, starch, casein or a synthetic resin latex; the particular adhesive used will depend, for example, on the printing process to be used, e.g. offset lithography requires the adhesive to be water-insoluble. Generally, the pigment will consist of clay, as the main constituent, and minor amounts, i.e. less than 20% by weight, of one or more other constituents, for example calcium carbonate, lithopone, barium sulphate, vitanium pigments, talc or satin white. The clays normally used for coating purposes comprise at least 70% by weight of particles having an equivalent spherical diameter less than two microns. The paper coating composition is usually prepared by dispersing the pigment and adhesive separately in the liquid medium, which is usually water, and mixing the two components together. The paper coating composition is then spread over the surface of the paper, dired and subjected to a finishing process, e.g. calendering or glazing. The principal properties of a paper which are affected by coating are its reflectance to light, its smoothness, its ink receptivity and its gloss.

Conventionally, the suitability of the optical properties of a mineral, for example a kaolinitic clay, which is to be used for paper coating purposes, is evaluated by determining the reflectance to visible light of a dry powder of the mineral or of a thick, adhesive-free coating of the mineral on paper. These tests are taken to be indicative of the probable performance of the mineral when used in a paper coating composition but they are not infallible and it often happens that a mineral which gives good results in these tests shows inferior behaviour when incorporated in a paper coating composition containing an adhesive.

It is an object of the present invention to prepare a mineral which is suitable for coating onto paper and which, when coated onto paper in a paper coating composition comprising an adhesive, provides a coated paper sheet of good reflectance to light.

SUMMARY OF THE INVENTION

According to the present invention, there is provided a method of preparing a mineral which is suitable for use in the coating of paper, which method comprises (i) forming a substantially uniform suspension of fine particles of the mineral in water; (ii) admixing the suspension thus obtained with a water-soluble or water-dispersible dispersible polymer which is such that, on drying the suspension, the particles of the mineral adhere to the polymer and to one another and the polymer is irreversibly rendered insoluble and non-dispersible in water; and (iii) dewatering and drying the suspension to form a material which is suitable for use in the coating of paper.

The aqueous suspension of fine particles of the mineral can be either flocculated or deflocculated. If the suspension is flocculated, it can comprise up to about 40% by weight of solids, whereas if the suspension is deflocculated, it can comprise up to about 70% by weight of solids. In general, better results are obtained when the solids content of the suspension is as high as possible.

DESCRIPTION OF THE PREFERRED EMBODIMENTS

The water-soluble or water-dispersible polymer can be a homopolymer or a copolymer; it can be a latex, e.g. of a poly(vinyl acetate), a poly(vinyl alcohol), a polyacrylate, or a styrene-butadiene rubber; or it can be a thermosetting resin, for example an epoxy resin, a phenol-formaldehyde resin or a melamine-formaldehyde resin. A suitable epoxy resin is that manufactured by CIBA (ARL) Ltd. and denoted GY278; a suitable phenolformaldehyde resin is that manufactured by Bakelite-Xylonite Limited and denoted R 10993; and a suitable melamine-formaldehyde resin is that manufactured by CIBA (ARL) Ltd. and denoted "RESICART ML 12".

The quantity of water-soluble or water-dispersible polymer used is preferably in the range of from 0.1 to 2.0% by weight based on the weight of dry mineral. An amount smaller than 0.1% reduces the effectiveness of the treatment and an amount larger than 2.0% introduces the undesirable effects of rendering the mineral more difficult to disperse and more viscous in suspension while also reducing the gloss of a paper coating in which the treated mineral is incorporated.

Dewatering and drying of the suspension can be carried out, for example, by filtering or centrifuging the suspension so as to form a cake and subsequently drying the cake, or by means of a spray drier or a drum drier.

When the mineral is or includes a clay the drying of the suspension should preferably be performed at a temperature not exceeding 120°C. If higher temperatures are used, the brightness of the mineral may begin to deteriorate. It is also preferable, if a cake is formed during the dewatering and drying step, for the dried mineral cake to contain less than 1% by weight of water. If the mineral has been treated with a compound comprising a water-soluble or water-dispersible latex, it is advantageous to dry the suspension to less than 1% by weight of water at a temperature not exceeding 80°C. If the mineral has been treated with a water-soluble or water-dispersible thermosetting resin, it is preferable to dry the suspension or the mineral cake, if this is formed during the dewatering, to less than 1% by weight of water at a temperature of at least 100°C.

The invention will now be illustrated by the following Examples.

EXAMPLE 1

100 grams of a kaolinitic clay from Washington County, Georgia, U.S.A., which had been subjected to froth flotation and which consisted of particles smaller than 5 microns equivalent spherical diameter, was mixed with water at pH 8.0 containing 0.2 g of tetrasodium pyrophosphate to form a suspension containing 50% by weight of solids. Whilst stirring, 2.4 ml of VINACRYL 4172 (a 50% suspension of a styreneacrylic acid copolymer manufactured by Vinyl Products Ltd.) was added. The clay suspension was then flocculated by adjusting the pH to 4.0 with acid, filtered, and the resulting cake dried at 80°C. for six hours. The reflectance to light of 457 mμ wavelength of the dry milled clay and of the clay coated onto a sheet with and without adhesive was measured, and, as a comparison, the reflectance to light of 457 mμ wavelength of the untreated clay was measured under corresponding conditions. The procedure employed was as follows:

a. Clay coated onto a sheet without adhesive

To 20 g of milled clay was added a mixture comprising 2 ml of a solution of a sodium polyacrylate dispersing agent of degree of polymerisation in the range 20–40 containing 2.5 g of the polyacrylate per 100 ml of solution, 0.15 ml of 2.5N sodium hydroxide solution and 6.5 ml of water. The mixture was stirred to form a uniform cream and 2.8 ml of a 1% w/v solution of sodium dodecyl benzene sulphonate was stirred in. The suspension was then passed through a No.100 mesh British Standard sieve. Three sheets of MELINEX (polyethylene terephthalate manufactured by I.C.I.Ltd.) having dimensionns 228 mm × 76 mm × 0.102 mm were then coated in the following way. A sheet was mounted on blotting paper and swabbed with a grease-free swab saturated in acetone. A puddle of the coating composition was then formed at one end of the sheet and spread over the sheet at a uniform rate with a draw bar coated giving a wet film thickness of 32 thou. (0.81 mm). The three sheets prepared in this way were then dried at room temperature, in the dark, at a relative humidity of 60%.

The three sheets were then cut in half perpendicular to the longest dimension and combined to form a stack. The diffuse reflectance of the stack was then measured using an ELREPHO Photoelectric Reflectance Photometer, previously calibrated with frosted glass standards, and Zeiss filter R457 (457 millimicrons wavelength). The top sheet of the stack was then transferred to the bottom and the measurement repeated. This was continued until each sheet had occupied every position in the stack. The means of the set of six measurements was then calculated. The mean was multiplied by 0.98 to convert it to the Absolute Reflectance value which is the value quoted in the Examples.

b. Clay coated onto a sheet with 15% by weight of adhesive based on the weight of dry clay 20 g of milled clay was mixed to a smooth cream with 10.6 ml of water containing 0.49 ml of a 10% w/v solution of sodium hexametaphosphate, 0.4 ml of a 10% w/v solution of sodium hydroxide and 0.11 ml of a 10% solution of the sodium polyacrylate dispersing agent. 1.81 g of VISCOSOL 310 starch (an oxidised potato starch containing 17% by weight of water) was then stirred in and the suspension heated, with continuous stirring to 85°C. in less than five minutes over a boiling water bath. The suspension was maintained at 85°C. for from four to five minutes and was then cooled in cold water to room temperature. 3.14 ml of styrene-butadiene rubber latex No.636, manufactured by the Dow Chemical Company and containing 50% by weight of solids, was then stirred in and the suspension diluted, when found necessary to about 53% by weight of solids, which corresponds approximately to the maximum viscosity for coating. The suspension was then passed through a No.100 mesh B.S. sieve and coated on MELINEX using a draw bar coated giving a wet film thickness of 32 thou. (0.81 mm) as described for the adhesive-free coating above. The reflectance measurements were also made as described above. The results obtained for the treated and untreated clay are set forth in Table I below:

Table I

| | % reflectance to light of 457 mμ | | |
| | dry milled | adhesive free | 15% adhesive |
|---|---|---|---|
| Original clay | 86.0 | 80.6 | 77.6 |
| Treated clay | 86.2 | 82.0 | 78.3 |

EXAMPLE 2

300 g of a second kaolin clay from Georgia, U.S.A. which consisted of particles smaller than 5 microns equivalent spherical diameter was mixed with water to form a suspension containing 20% by weight of solids. With vigorous stirring, 3.8 g of resin R10993 (P form), a phenol-formaldehyde resin manufactured by Bakelite-Xylonite Ltd., was added. After this treatment the clay was found to be partially deflocculated and the pH was adjusted to 4.0 with acid in order to flocculate the clay. The suspension was filtered and the cake dried at 120°C. for 16 hours. The brightness was measured as in Example 1 and the results for the treated and untreated clay are given in Table II below:

Table II

| | % reflectance to light of 457 mμ | | |
| | dry milled | adhesive free | 15% adhesive |
|---|---|---|---|
| Original clay | 84.9 | 72.5 | 74.8 |
| Treated clay | 84.9 | 73.3 | 75.8 |

I CLAIM:

1. A method of improving the optical properties of mineral coated paper in which the mineral is a silicate mineral having a layer lattice structure, which comprises treating the mineral prior to its incorporation into a paper coating composition so as to cement together the ultra fine particles of the mineral and to form an inelastic material therefrom, the treatment comprising (i) forming a substantially uniform suspension of fine particles of the mineral in water; (ii) admixing the suspension thus obtained with a polymer which is a non-amylaceous latex and which is (a) initially water-soluble or water-dispersible and (b) such that, on drying the suspension, the particles of the mineral adhere to the polymer and to one another and the polymer is irreversibly rendered insoluble and non-dispersible in water, the amount of said polymer being from 0.1 to 2.0% by weight based on the weight of dry mineral; (iii) flocculating the aqueous suspension; (iv) dewatering and drying the suspension including the step of heating to a temperature not more than 80°C. so as to bind the polymer to the mineral particles and to render said polymer irreversibly insoluble and non-dispersible in water; and (v) thereafter dispersing the treated mineral in an aqueous medium containing an adhesive to produce a paper coating composition; and (vi) coating paper with said composition.

2. A method according to claim 1, wherein said polymer comprises a latex of a poly(vinyl acetate), a poly(vinyl alcohol), a polyacrylate or a styrene-butadiene rubber.

3. A method according to claim 2, wherein said suspension is dewatered and dried to form a mineral cake containing less than 1% by weight of water.

4. A method according to claim 1, wherein said silicate mineral is a kaolinitic clay.

5. A metehod of improving the optical properties of mineral coated paper in which the mineral is a silicate mineral having a layer lattice structure, which comprises treating the mineral prior to its incorporation into a paper coating composition so as to cement together the ultra fine particles of the mineral and to form an inelastic material therefrom, the treatment comprising (i) forming a substantially uniform suspension of fine particles of the mineral in water; (ii) admixing the suspension thus obtained with a polymer which is a thermosetting resin and which is (a) initially water-soluble or water-dispersible and (b) such that, on drying the suspension, the particles of the mineral adhere to the polymer and to one another and the polymer is irreversibly rendered insoluble and non-dispersible in water, the amount of said polymer being from 0.1 to 2.0% by weight based on the weight of dry mineral; (iii) flocculating the aqueous suspension; (iv) dewatering and drying the suspension including the step of heating to a temperature of at least 100°C. so as to bind the polymer to the mineral particles and to render said polymer irreversibly insoluble and non-dispersible in water; and (v) thereafter dispersing the treated mineral in an aqueous medium containing an adhesive to produce a paper coating composition; and (vi) coating paper with said composition.

6. A method according to claim 1, wherein said thermosetting resin is an epoxy resin, a phenol-formaldehyde resin or a melamine-formaldehyde resin.

7. A method according to claim 6, wherein said suspension is dewatered and dried at a temperature not exceeding 120°C.

8. A method according to claim 7, wherein said suspension is dewatered and dried to form a mineral cake containing less than 1% by weight of water.

9. A method according to claim 5, wherein said silicate mineral is a kaolinitic clay.

* * * * *